N. S. ERICKSON.
ICE BOX.
APPLICATION FILED JULY 28, 1915.
1,201,281.
Patented Oct. 17, 1916.
2 SHEETS—SHEET 1.
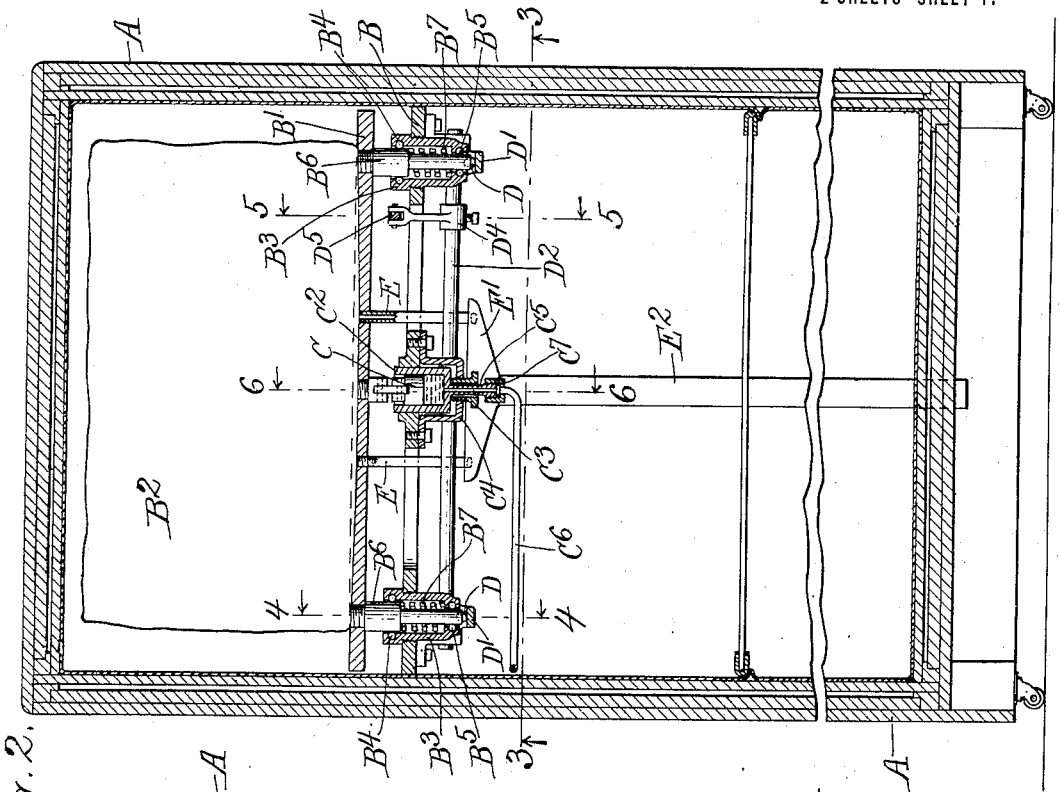
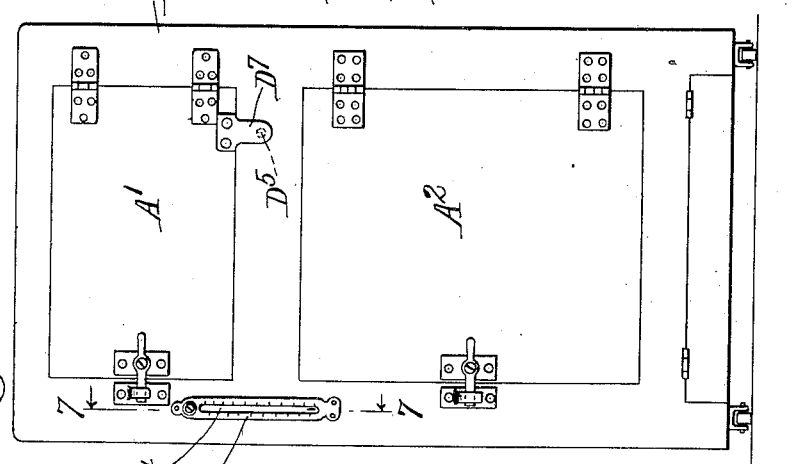
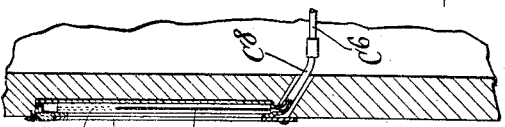
Witnesses,
Edward T. Wray.
Minnie M. Lindeman.
Inventor.
Nels S. Erickson.
by Parker & Carter
Attorneys.

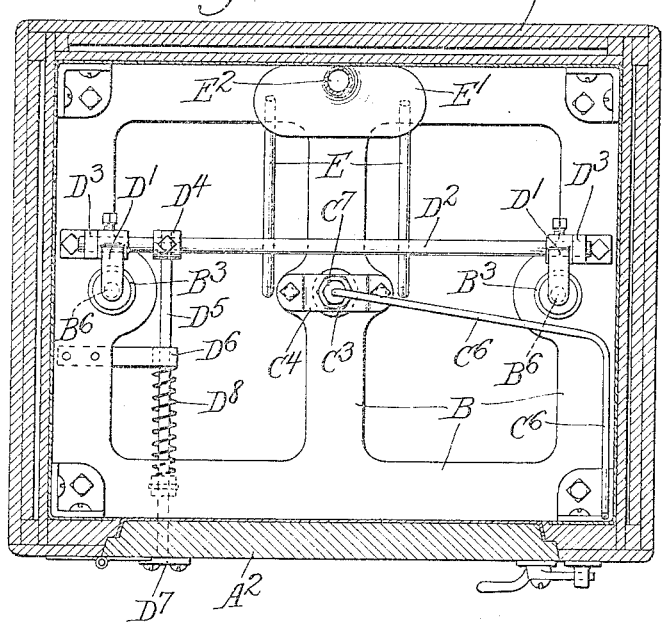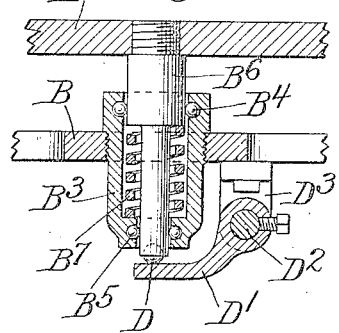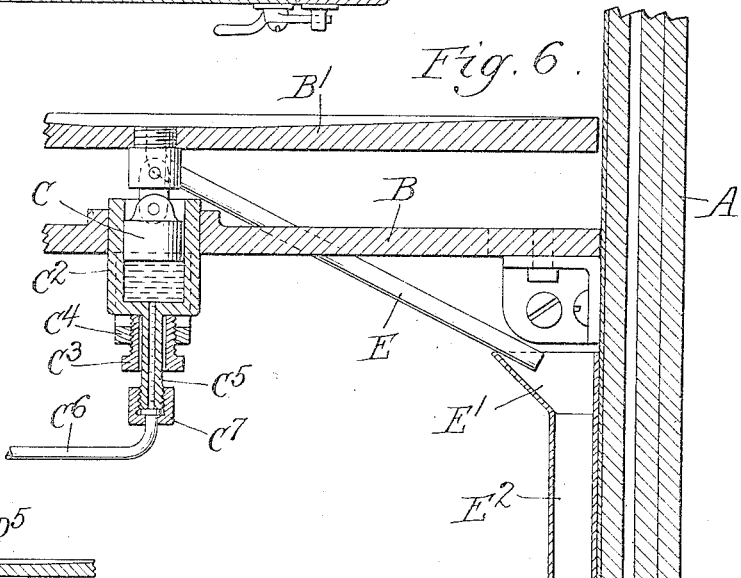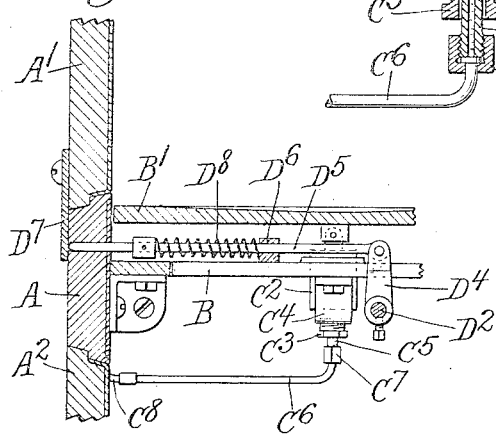

UNITED STATES PATENT OFFICE.

NELS S. ERICKSON, OF CHICAGO, ILLINOIS, ASSIGNOR OF ONE-THIRD TO JOSEPH R. BURRES, OF CHICAGO, ILLINOIS.

ICE-BOX.

1,201,281. Specification of Letters Patent. Patented Oct. 17, 1916.

Aplication filed July 28, 1915. Serial No. 42,265.

*To all whom it may concern:*

Be it known that I, NELS S. ERICKSON, a citizen of the United States, residing at Chicago, in the county of Cook and State of Illinois, have invented a certain new and useful Improvement in Ice-Boxes, of which the following is a specification.

My invention relates to improvements in ice boxes and has for one object to provide for automatically indicating the weight of ice in the box at any time.

Another object is to protect the weighing mechanism so that it will be inoperative when not needed.

Another object of my invention is to render the weighing mechanism inoperative whenever the ice box door is closed.

Other objects of my invention will appear in the specification.

My invention is illustrated more or less diagrammatically in the accompanying drawings, wherein—

Figure 1 is a front elevation; Fig. 2 is a vertical section; Fig. 3 a section along the line 3—3 of Fig. 2; Fig. 4 a section along the line 4—4 of Fig. 2; Fig. 5 a section along the line 5—5 of Fig. 2; Fig. 6 a section along the line 6—6 of Fig. 2; Fig. 7 a section along the line 7—7 of Fig. 1.

Like parts are indicated by like characters in all the figures.

A is an ice box having doors $A^1$, $A^2$ leading respectively to the ice chamber and the provision chamber.

$A^3$ is a scale calibrated in pounds, on the front of the ice box. Appearing through this scale is a manometer tube $A^4$, in which may be seen a column of mercury, alcohol or other suitable fluid, $A^5$.

B is a supporting frame rigidly mounted in the ice box, immediately below the bottom of the ice chamber.

$B^1$ is a floor plate spaced from the walls of the ice box, and forming the floor of the ice chamber.

$B^2$ is a cake of ice resting upon this floor.

$B^3$ $B^3$ are sleeves rigidly mounted in the frame B, having at either end guide bearings $B^4$, $B^5$, to guide the spring supported plungers $B^6$, which support the floor plate $B^1$. The springs supporting these plungers are contained within the sleeves, as indicated at $B^7$.

C is a piston loosely carried by the floor plate $B^1$, and free to reciprocate in a cylinder $C^2$, which cylinder is adapted to slide in the frame B, being held adjustably in position therein by the hollow plug $C^3$, screw threaded in a stirrup $C^4$, and adapted to abut upon and support the bottom of the cylinder.

$C^5$ is a pipe discharging from the bottom of the cylinder passing through the hollow sleeve $C^3$, and communicating with a pipe $C^6$, being held thereagainst by a coupling $C^7$. This pipe $C^6$ communicates with pipe $C^8$, which passes through the wall of the ice box, and in turn communicates with the manometer tube $A^5$.

The plungers $B^6$ project downwardly from the bottom of the sleeves $B^3$, and are provided at their lower ends with bearing members D, which rest against the ends of levers $D^1$. These levers $D^1$ are rigidly mounted each on a shaft $D^2$, which shaft is mounted for rotation in bearings $D^3$, on frame B.

$D^4$ is a rocker arm rigidly mounted on the shaft $D^2$. It is in pivotal connection with a reciprocating rod $D^5$, guided in a bearing $D^6$, and projecting out through the wall of the ice box A, so as to be contacted by a plate $D^7$, on the door $A^1$. A spring $D^8$, tends yieldingly to thrust the rod outwardly, thus rocking the shaft and freeing the members $D^1$ from engagement with lower end of the plungers $B^6$.

E E are drip pipes projecting downwardly from low point on the surface of the ice floor, and discharging into a funnel $E^1$, which in turn communicates with a discharge passage $E^2$ discharging out of the ice box.

It will be evident that while I have shown in my drawings the operative device still many changes might be made in size, shape and arrangements of parts without departing materially from the spirit of my invention, and I wish, therefore, that my drawings be regarded as in a sense diagrammatic.

The use and operation of my invention is as follows: When the ice box door is closed the spring held pin is thrust inwardly by the plate on the door. The shaft is rocked, the levers are brought into engagement with the plungers supporting the ice floor, and the load is lifted from the springs, thus relieving the pressure on them and protecting them against undue service. When the ice box door is opened, however, the spring held rod is pressed out by the springs, and the ice supporting plungers are no longer supported by anything except the springs. The ice then compresses the springs a certain distance, proportionately to the weight of the ice. The downward movement of the floor, compressing these springs, will also cause the piston to pass down into its cylinder, compressing the liquid contained therein and causing it to rise in the manometer. If the tube has been properly calibrated it will give a direct reading of the amount of ice in the ice box, and the operator will then have a positive check on the amount of ice used or upon the amount of ice bought and delivered. After the device has been installed if any change takes place the manometer reading can be adjusted by varying the height of the cylinder with respect to the piston, by the means shown—thus the scale can always be corrected for any change in weight or variation in the resistance of the springs.

I claim:

1. The combination with an ice box of an ice floor, a plurality of plungers downwardly depending therefrom, a guide member in which each plunger is slidably mounted, a resilient supporting spring contained within each guide member, said plungers extending below said guide members, a rock shaft, rock arms rigid thereon extending beneath said plungers and means responsive to the closure of the ice box door for rotating said rock shaft to lift the weight of the floor through said plungers off the springs.

2. The combination with an ice box of an ice floor, a plurality of plungers downwardly depending therefrom, a guide member in which each plunger is slidably mounted, a resilient supporting spring contained within each guide member, said plungers extending below said guide members, a rock shaft, rock arms rigid thereon extending beneath said plungers and means responsive to the closure of the ice box door for rotating said rock shaft to lift the weight of the floor through said plungers off the springs, a cylinder, a connection between it and an indicating device, a piston free to move in the cylinder and a flexible connection between the piston and the floor.

In testimony whereof, I affix my signature in the presence of two witnesses this 21st day of July 1915.

NELS S. ERICKSON.

Witnesses:
MINNIE M. LINDENAU,
CHRISTINA DEANS.